Aug. 9, 1960 A. L. MALOY ET AL 2,948,183
AUTOMATIC LIQUID FEEDING SYSTEM IN A FLAME SPECTROPHOTOMETER
Filed May 22, 1956
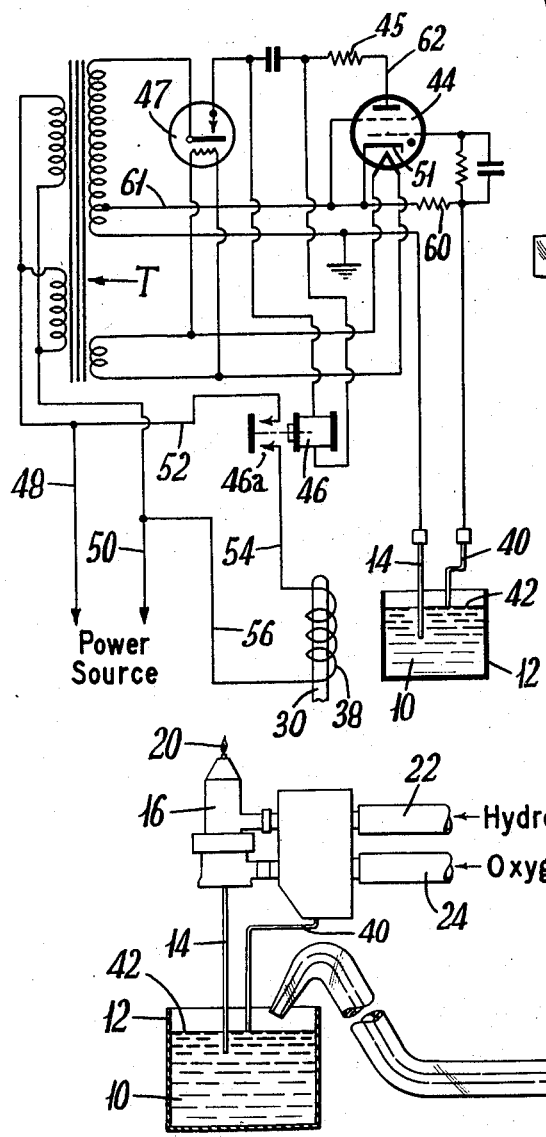
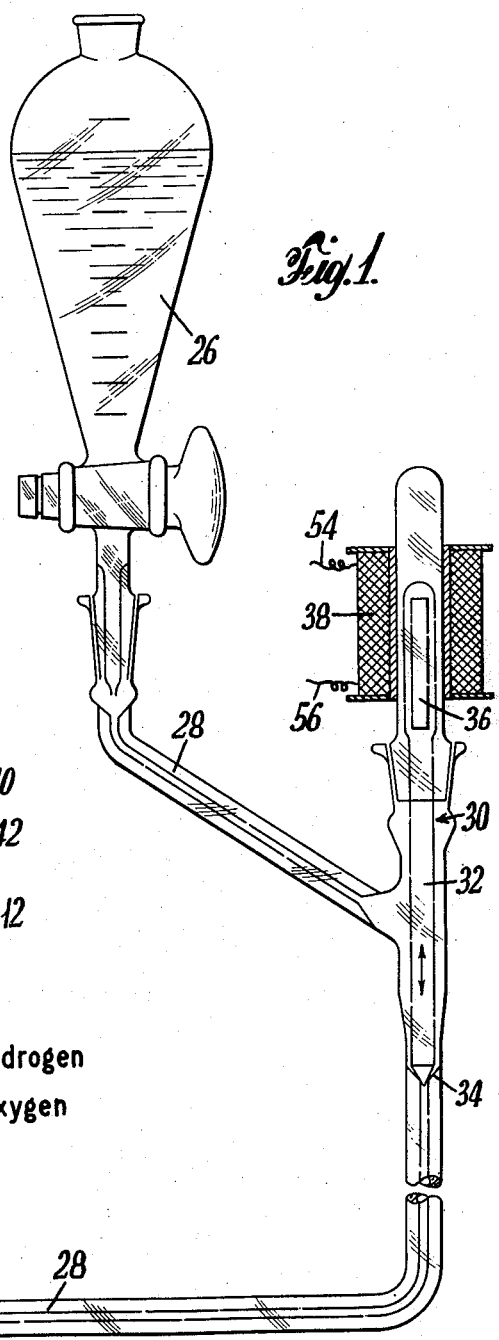
INVENTORS
ARTHUR L. MALOY
FREDERICK L. BOGGS
BY Gerard R. O'Brien jr.
ATTORNEY

United States Patent Office 2,948,183
Patented Aug. 9, 1960

2,948,183

AUTOMATIC LIQUID FEEDING SYSTEM IN A FLAME SPECTROPHOTOMETER

Arthur L. Maloy, South Charleston, and Frederick L. Boggs, Dunbar, W. Va., assignors to Union Carbide Corporation, a corporation of New York Filed May 22, 1956, Ser. No. 586,459

2 Claims. (Cl. 88—14)

The present invention relates to an automatic liquid feeding system and, more particularly, to such a system for feeding solution to a vessel to maintain the liquid level therein at a constant and predetermined value.

In many types of testing apparatus solution is fed from a vessel of limited capacity to the testing region and, when a quantity of solution is withdrawn, the testing operation must be stopped until the supply of solution in the vessel can be replenished. One type of such apparatus is a recently-developed flame spectrophotometer which measures photometrically the quantity of light of any particular wave-length range emitted by the burning of a sample solution. In the operation of this apparatus, a limited quantity of the sample solution is aspirated from a vessel and passed into a flame zone for measurement. A system which can provide for the automatic feeding of sample solution to this vessel of limited capacity would permit continuous and automatic operation of the flame spectrophotometer and eliminate the need for periodically stopping the measuring operation in order to replenish the supply of sample solution in the vessel. In addition, such an automatic sample feeding system, capable of maintaining sample solution in the vessel at a constant level, would provide greater uniformity in rate of aspiration and hence a more accurate measurement.

It is, therefore, the main object of the present invention to provide an automatic sample solution feeding system for such apparatus.

Other aims and advantages will be apparent from the following description and appended claims.

In accordance with the present invention, apparatus is provided for automatically feeding a solution to a vessel into which solution is fed and from which solution is concurrently removed to maintain the solution level therein at a constant and predetermined value. Such apparatus comprises a solution reservoir positioned to permit the flow of solution to the vessel by gravity, conduit means communicating between the reservoir and the vessel and containing electromagnetic valve means for arresting the flow of solution therethrough, electrically-conductive probe means positioned in the vessel so as to complete an electric circuit through the solution when the solution level reaches a predetermined level, and electric circuit relay means communicating with the electrically-conductive probe means for energizing the electromagnetic valve to control the flow of solution through the conduit means. The electric circuit relay means acts to arrest the flow of solution through the conduit means when the electrically-conductive probe means is short circuited by the solution attaining the predetermined level and acts to de-energize the electric circuit relay and open the electromagnetic valve to permit the flow of solution through the conduit means when the solution level falls below the predetermined value.

In the drawing:

Fig. 1 is a partial schematic view of an automatic sample solution feeding system embodying the invention; and Fig. 2 is an electric circuit diagram of the apparatus of Fig. 1 including the electric circuit relay means.

As shown specifically in the embodiment of the drawing, sample solution 10 is aspirated from vessel 12 through electrically-conductive capillary tube 14 to burner 16 of flame spectrophotometer (not shown) and is discharged into the flame zone 20 to provide the desired photometric measurement. Conduits 22 and 24 are provided for supplying hydrogen and oxygen, respectively, to the burner 16 of flame spectrophotometer (not shown). A reservoir 26 of sample solution 10 is positioned above vessel 12 and communicates with conduit 28 for feeding sample solution to vessel 12. Electromagnetic valve means 30 is provided in the sample solution feed conduit 28 and its vertical positioning controls the flow of solution therethrough to vessel 12.

As shown, electromagnetic valve means 30 comprises an outer member 32, of glass or other suitable material, engaging valve seat 34 at the lower end thereof and having a ferromagnetic slug 36, of iron or the like, positioned therein. Solenoid coil 38 is provided around electromagnetic valve 30 and serves to actuate the valve by raising and releasing ferromagnetic slug 36.

An electrically-conductive capillary tube 14 comprises one inlet probe to electric circuit relay means which actuates solenoid coil 38. A second electrically-conductive probe 40 is positioned in vessel 12 at a point selected as the predetermined solution level 42 at which the solution in vessel 12 is to be maintained.

The electric circuit relay means comprises control tetrode 44 in series circuit arrangement with plate current resistor 45, solenoid coil 46 and thermal delay switch 47, all of which are energized through transformer T from power lines 48 and 50. Thermal delay switch 47 is provided to insure that plate current does not flow in the circuit until cathode 51 of tetrode 44 is sufficiently heated.

The normal operating condition of this control circuit is with tube 44 conducting through the closed thermal delay switch 47, thereby energizing solenoid coil 46 and closing contactors 46a in the secondary solenoid coil circuit comprising lines 52, 54 and 56. Under these conditions, solenoid coil 38 is energized by the power from lines 48 and 50, and electromagnetic valve 30 is raised to permit the flow of sample solution 10 from reservoir 26 through conduit 28 to vessel 12. When the liquid level in vessel 12 reaches the level 42, the solution short-circuits the electrically-conductive probes 14 and 40, thereby short-circuiting resistor 60 in the grid circuit of tetrode tube 44 through line 61 and a portion of the secondary of transformer T. This interrupts the flow of plate current through line 62 of the tetrode circuit, and results in the de-energization of solenoid coil 46, thereby opening contactors 46a and de-energizing solenoid coil 38. Upon the de-energization of solenoid coil 38, the electromagnetic valve 30 falls, under the influence of gravity, against seat 34 and arrests the flow of sample solution from reservoir 26 through conduit 28 to vessel 12.

In this manner, the liquid feeding system of the invention provides sample solution at a constant and predetermined level in vessel 12, thereby providing a constant level sample reservoir with unlimited capacity without interrupting the operation of the testing apparatus. The reservoir 26 is of limitless capacity since it may be refilled at any time without disrupting the flow of sample solution to the testing apparatus.

While the automatic liquid feeding system of the invention has been specifically described in connection with the feeding of sample solution to a flame spectrophotometer, it is, of course, to be understood that the invention is not so limited in application and may be advantageously employed for the automatic feeding of any electrically-conductive liquid to any vessel from which liquid is being withdrawn,

What is claimed is:

1. In combination with a flame spectrophotometer wherein a sample solution is aspirated from a sample solution-containing vessel through an electrically-conductive capillary tube into a flame zone for measurement, apparatus for automatically supplying sample solution to said vessel to maintain the solution level therein at a constant predetermined value comprising, a reservoir of such sample solution positioned to permit flow of solution to said vessel by gravity; conduit means communicating between said reservoir and said vessel and containing electromagnetic valve means for arresting the flow of solution therethrough; electrically-conductive probe means positioned in said vessel so as to complete an electric circuit through said solution when said solution reaches a predetermined level one of said probe means comprising said electrically-conductive capillary tube; and electric circuit relay means communicating with said electrically-conductive probe means for energizing said electromagnetic valve to permit the flow of solution through said conduit means when said electrically-conductive probe means is not short-circuited by said solution attaining said predetermined level and for de-energizing and closing said electromagnetic valve to arrest the flow of solution through said conduit means when said solution is at a level of said predetermined value.

2. An apparatus as set forth in claim 1 wherein the electric circuit relay means comprises an electron tube having suitable plate and grid circuits and wherein the actuating coil of the relay is located in such plate circuit, and wherein the probe means are connected in the grid circuit of said tube so that short circuiting of said probe means by the presence of liquid therebetween causes the plate current of the tube to be interrupted.

References Cited in the file of this patent

UNITED STATES PATENTS

| | | |
|---|---|---|
| 1,346,898 | Kingsbury | July 20, 1920 |
| 2,433,599 | Cohen | Dec. 30, 1947 |
| 2,483,450 | Wolfner | Oct. 4, 1949 |
| 2,532,687 | Weichselbaum | Dec. 5, 1950 |
| 2,642,891 | Harrison et al. | June 23, 1953 |
| 2,714,833 | Gilbert | Aug. 9, 1955 |
| 2,753,753 | Gardiner | July 10, 1956 |